United States Patent [19]

Epel et al.

[11] Patent Number: 4,707,317

[45] Date of Patent: Nov. 17, 1987

[54] METHOD OF MAKING LEAF SPRING

[76] Inventors: Joseph N. Epel, 22559 Bellbrook, Southfield, Mich. 48034; John J. Morse, III, 742 LaBrosse, Rochester, Mich. 48063; Terry N. Trebilcock, 14615 Burns, Southgate, Mich. 48195

[21] Appl. No.: 835,086

[22] Filed: Feb. 28, 1986

Related U.S. Application Data

[60] Continuation of Ser. No. 578,920, Apr. 23, 1984, abandoned, which is a division of Ser. No. 273,787, Jun. 15, 1981, abandoned.

[51] Int. Cl.$^4$ ............... B29B 15/10; B29C 43/18
[52] U.S. Cl. .................................. 264/136; 156/180; 264/137; 264/257; 264/258; 267/47; 425/112; 425/115
[58] Field of Search ............... 264/136, 137, 257, 258, 264/103, 320; 425/112, 115; 267/47, 54 R; 156/180

[56] References Cited

U.S. PATENT DOCUMENTS

| 3,530,212 | 9/1970 | Kienle et al. | 264/137 |
| 3,761,560 | 9/1973 | Newlove | 264/258 |
| 3,814,410 | 6/1974 | Fukui et al. | 267/47 |
| 3,900,357 | 8/1975 | Huchette et al. | 267/47 |
| 3,968,958 | 7/1976 | Huchette et al. | 267/47 |
| 4,305,903 | 12/1981 | Krause | 264/320 |
| 4,318,762 | 3/1982 | Meyer | 264/137 |
| 4,352,769 | 10/1982 | Meyer | 264/137 |
| 4,475,723 | 10/1984 | Meyer | 267/54 |
| 4,560,525 | 12/1985 | Ryan | 264/320 |
| 4,565,356 | 1/1986 | Nickel | 264/257 |

FOREIGN PATENT DOCUMENTS

| 3200877 | 7/1983 | Fed. Rep. of Germany | 264/257 |
| 56-53032 | 5/1981 | Japan | 264/257 |
| 57-32917 | 2/1982 | Japan | 264/257 |

Primary Examiner—Jeffery Thurlow
Attorney, Agent, or Firm—Edward M. Farrell; Herman Foster; Thomas I. Davenport

[57] ABSTRACT

A non-metallic leaf spring in which a unitary body member is made up of strands of glass fibers distributed in a matrix of polymerized epoxy resin. The spring is provided with end fittings and a mounting assembly intermediate the ends of the spring by which the spring can be mounted between suspended and unsuspended structures without causing stress concentrations at the non-metallic spring. The method and apparatus by which the spring is manufactured casues strands of fiber to be distributed throughout the spring at a substantially uniform density throughout the longitudinal length of the spring.

1 Claim, 18 Drawing Figures

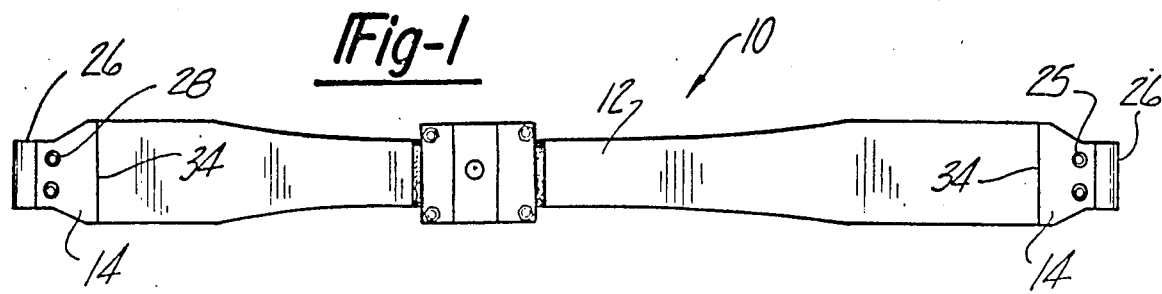
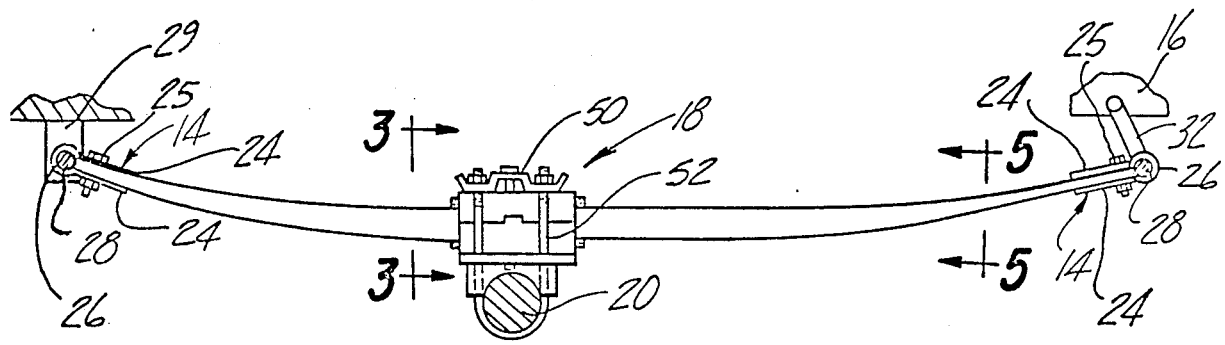
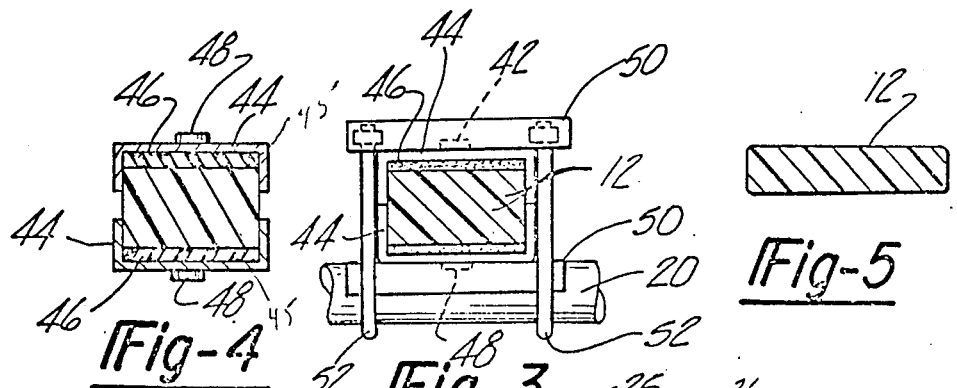
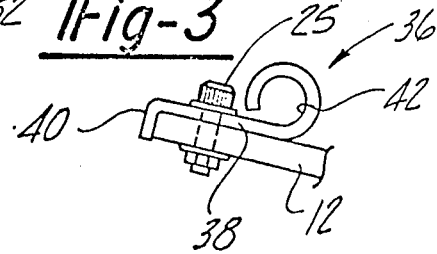

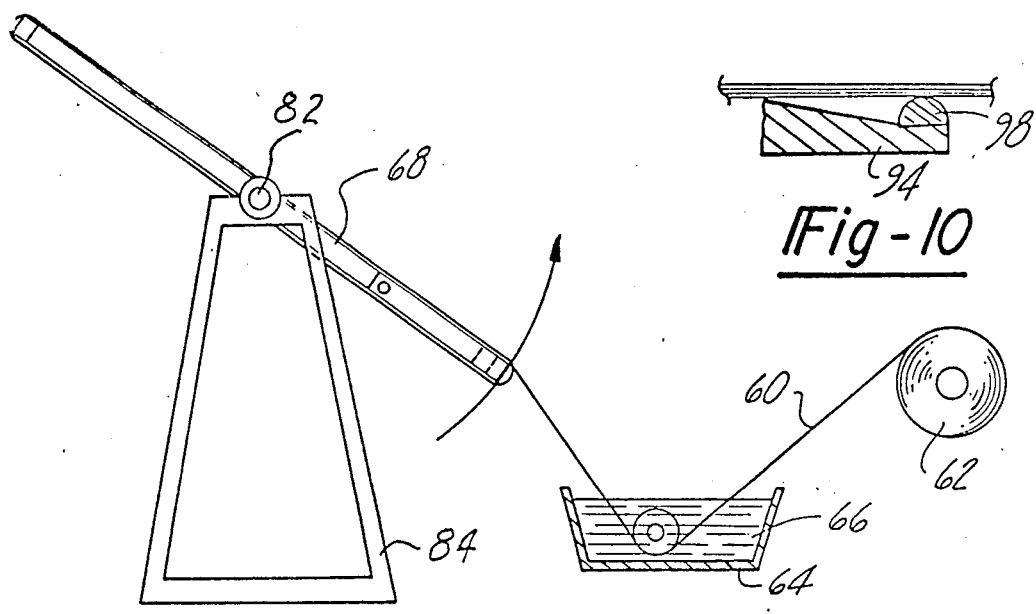
Fig-10
Fig-7
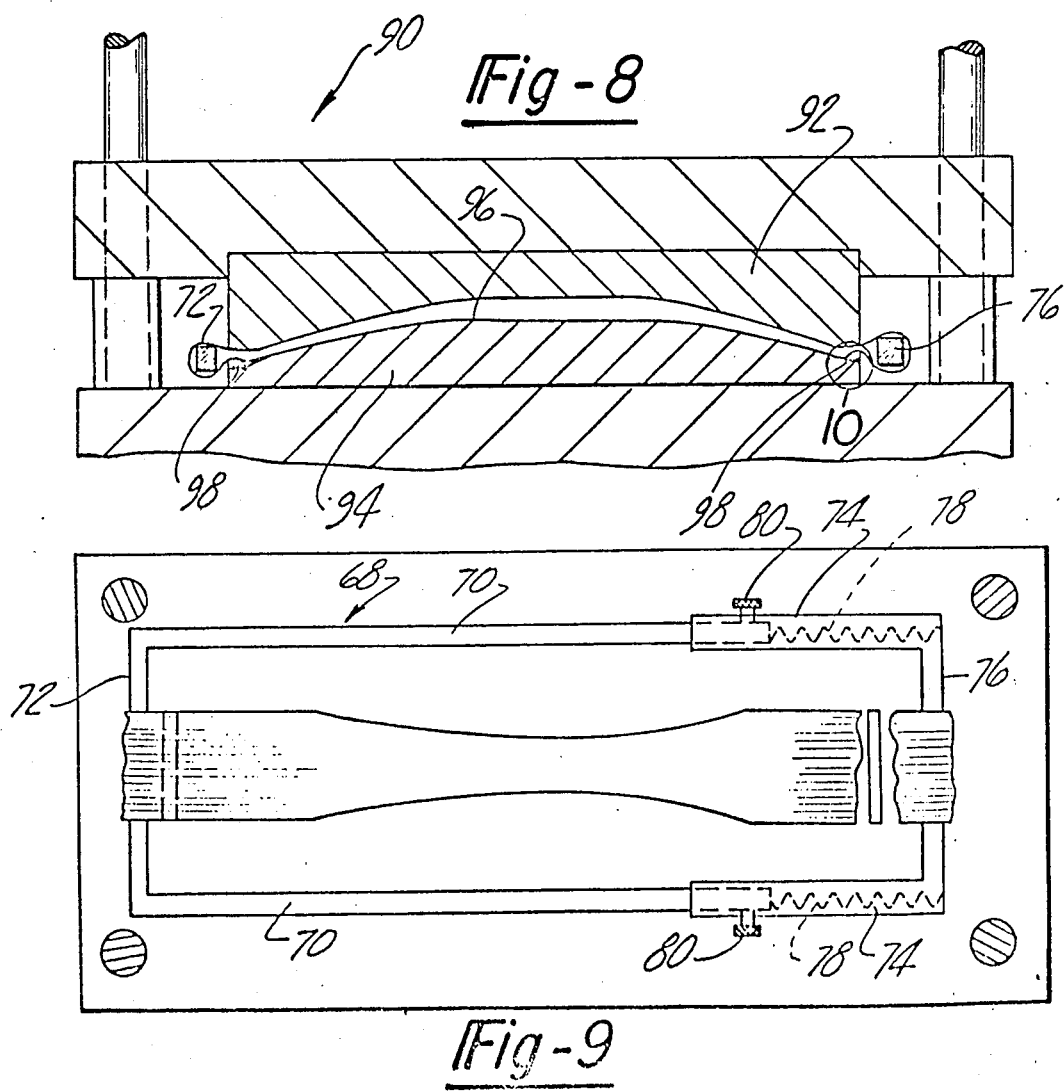
Fig-8
Fig-9

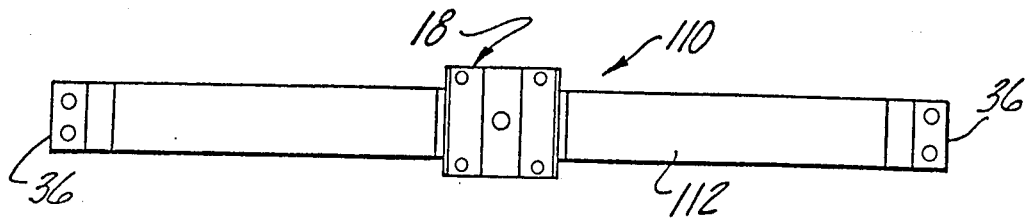
Fig-11
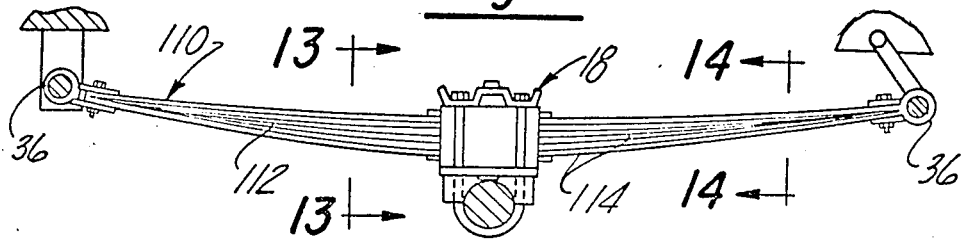
Fig-12
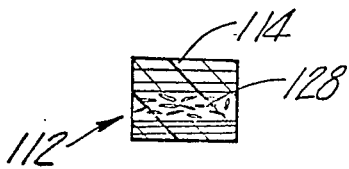
Fig-13
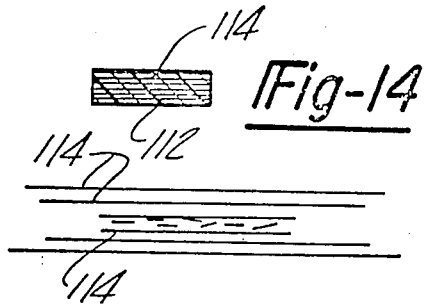
Fig-14
Fig-15
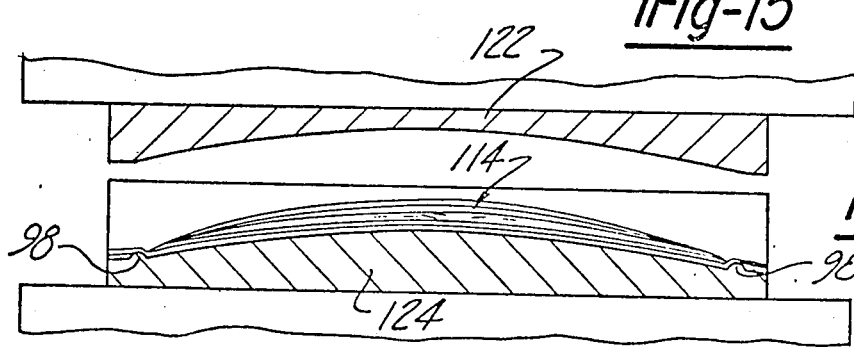
Fig-16
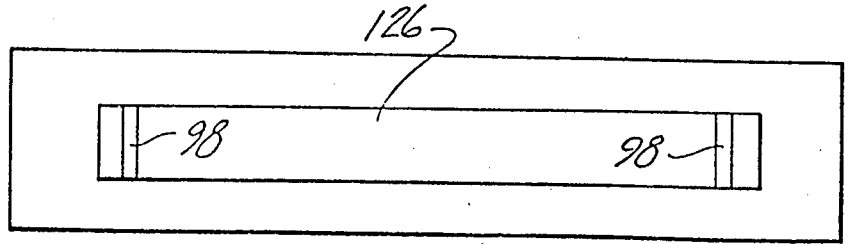
Fig-17
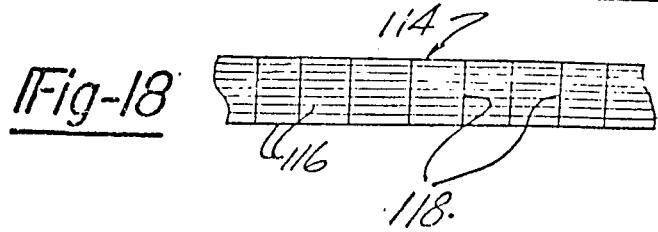
Fig-18

4,707,317

METHOD OF MAKING LEAF SPRING

This is a continuation of application Ser. No. 578,920, filed Apr. 23, 1984, now abandoned, which was a division of application Ser. No. 273,787, filed June 15, 1981, now abandoned.

This invention relates to leaf springs and, in particular to non-metallic leaf springs.

Metal leaf springs are well known and have been used extensively, particularly in the automotive field, to suspend vehicle bodies relative to axle structures for ground engaging wheels. Such metal springs are heavy, adding substantially to the weight of the vehicle and therefore to the energy required to propel the vehicle. Moreover, metal leaf springs are made up of multiple leaves sometimes as many as ten which must be joined together. The adjacent leaves are subject to noise and interleaf friction during flexing of the spring, accumulate dirt and moisture, and are subject to corrosion. The metal leaf springs also serve to transmit sounds between suspended and unsuspended body portions of vehicles.

It is an object of the invention to provide a non-metallic leaf spring structure in which a unitary body member is made up of strands of fibers distributed in a matrix of polymerized resin.

Another object of the invention is to provide a non-metallic spring displaying all of the advantageous characteristics of metallic springs but providing improved characteristics such as lower weight, sound and vibration insulation, no noise during flexing, and having resistance to corrosion.

Still another object of the invention is to provide a method of manufacturing a non-metallic spring in which strands of fiber extending longitudinally in the spring, are arranged at a substantially uniform density when considered at a cross-section of the spring.

A further object of the invention is to provide apparatus for the manufacture of a non-metallic spring in which resin coated strands of fiber are maintained under tension and in a substantially parallel relationship to each other to insure uniformity of distribution throughout the cross-sectional area of the spring.

The objects of the invention are accomplished by a leaf spring for suspending structures relative to each other in which a unitary elongated member is made up of a plurality of parallel strands of fiber in a matrix of polymerized resin. The strands extend primarily longitudinally in the body member and are distributed substantially uniformly in the matrix of resin. The non-metallic elongated member is provided with metal fittings at its opposite ends and a mounting assembly supported on the elongated member intermediate its opposite ends. Both the end fittings and mounting assembly are attached to the elongated member in a manner avoiding stress concentrations contributing to the durability and functioning of the spring. The method by which the spring is made includes the distribution of strands of fibers generally longitudinal in the spring so that the fibers are arranged at a substantially uniform density throughout each of the cross-sections of the spring throughout its entire length. Apparatus for making the spring includes a mold having resin dams at its opposite ends which serve to trap resin within the mold as the mold halves come to a closed position under pressure, thereby insuring that the mold cavities are completely filled with resin. Also, in one embodiment of the invention, the strands are maintained under tension.

These and other objects of the invention will become apparent from the following description and from the drawings in which:

FIG. 1 is a top plan view of a spring assembly embodying the present invention;

FIG. 2 is a side elevation of the spring assembly shown in a mounted condition between sprung and unsprung bodies.

FIG. 3 is a cross-sectional view taken generally on line 3—3 in FIG. 2;

FIG. 4 is a cross-sectional view, similar to FIG. 3, except that the spring is shown in its unmounted condition;

FIG. 5 is a cross-sectional view taken generally on line 5—5 in FIG. 2;

FIG. 6 is a view of a modified form of end attachment;

FIG. 7 is a diagrammatic view of the method and apparatus employed in making the spring embodying the invention;

FIG. 8 is a cross-sectional view of the molding apparatus used in forming the spring;

FIG. 9 is a top view of the bottom portion of the mold seen in FIG. 8;

FIG. 10 is an enlarged view of a portion of the structure seen in FIG. 9.

FIG. 11 is a top plan view of another embodiment of a spring assembly;

FIG. 12 is a side elevation partly in cross-section of the spring assembly shown in FIG. 11;

FIG. 13 is a cross-sectional view taken generally on line 13—13 in FIG. 12;

FIG. 14 is a cross-sectional view taken generally on line 14—14 in FIG. 12;

FIG. 15 is a diagrammatic view showing an arrangement of tapes of filament in the manufacture of the spring assembly in FIGS. 11 and 12;

FIG. 16 is a view of a mold in its loaded condition just prior to molding;

FIG. 17 is a view of the mold taken on line 17—17 in FIG. 16; and

FIG. 18 is a view of a portion of a tape of glass fiber strands used to form the spring in FIGS. 11 and 12.

Referring to the drawings, FIG. 1, one aspect of the invention is embodied in the spring assembly 10 including an elongated leaf spring body member 12 having end fittings 14 for connecting the spring assembly 10 to a sprung structure 16 and a center mounting assembly 18 by which the spring body member 12 can be connected to an unsprung member 20 as the axle of a vehicle.

Spring body member 12 is made up of a plurality of continuous strands of fiber such as glass which are arranged in a parallel adjacent relationship to each other in a matrix of polymerized resin, such as epoxy. As seen in FIG. 2, the configuration of the spring body 12 is such that it is thickest or has the greatest vertical height, at a point intermediate its opposite ends and is the thinnest at its opposite ends. The spring body 12 has a uniform cross-sectional area throughout its length. Because of the varying thickness of the spring body 12, this requires that the central portion of the spring be the narrowest and that the opposite ends be wide, as can be seen in FIG. 1 and from comparison of the section of the spring body 12 in FIGS. 4 and 5. By maintaining such a uniform cross-section throughout the length of the spring body 12, it is possible to use continuous strands with the same number of strands in all of the cross-sec tions and, at the same time, provide a uniform distribution of the stands. In actual practice, it has been found desirable when using glass fiber to maintain the ratio of the area of the strands and the area of the resin at least equal to each other with the area of the strands not in excess of about sixty-three percent nor less than fifty percent of the total cross-sectional area.

The end fittings 14 seen in FIGS. 1 and 2 by which the spring body 12 can be supported relative to the sprung structure 16 are generally U-shaped having spaced apart parallel legs 24 adapted to be disposed at opposite top and bottom sides of the spring body 12. The end fittings 14 are held in position relative to the body member 12 by bolts 25. The legs 24 are joined together by an eye portion 26 which is adapted to receive a transverse mounting bolt 28. The forward or left end of the spring body 12, as viewed in FIG. 2, may be pivotally supported by way of a bolt 28 passing through a fixed bracket 29 and the rear or right end of the spring body 12 can be pivotally connected by a bolt 28 to a link structure 32 to accommodate changes in the spacing between the pair of bolts 28 associated with each of the springs upon deflection of the spring body 12. In the present instance, the end fittings 14 and particularly the ends 34 of the legs 24 are substantially wider than the eyes 26 with the width of the ends 34 being equal to the relatively wide end of the spring body 12. The end fittings 14 are held in position by the bolts 25 which pass through the legs 24 and through the ends of the spring body 12 to hold the end fittings 14 securely in position. The wider part of the legs 24 serves to distribute the loads imposed through the end fittings 14 more uniformly throughout the entire width of the spring body 12 without localized stress concentrations.

Another form of end fitting which can be used with spring body 12 is disclosed in FIG. 6 and is designated generally at 36. End fitting 36 includes a base portion 38 which is adapted to be disposed on the top surface of the end of the spring body 12. The base portion 38 is provided with a downturned flange 40 that engages the end of the spring body member 12. An eye 42 is formed opposite the flange 40 to receive mounting bolts and bushings such as the shackle bolts 28 seen in FIG. 2. The end fittings 36 are secured to the spring body member 12 by means of bolts 25 in a manner similar to the end fittings 14 seen in FIGS. 1 and 2.

The mounting assembly 18 disposed at an intermediate portion of the spring body member 12 and serving to connect the spring body member 12 to an unsprung body structure such as axle 20 includes a pair of channel elements 44 which are disposed at opposed top and bottom portions of the body member 12 with the open channel portions facing each other. The bottoms 45 of the channel elements each are provided with a rubber pad 46. The rubber pads 46 are bonded or mechanically locked to their associated channel element 44, as well as to the spring body 12. One or both of the channel elements 44 can be provided with a locating boss 48 formed rigidly with the associated channel element 44. The bosses 48 are intended to be received in complementary openings formed in a clamp element 50 or in an axle seat 51 disposed on the axle 20.

The axle 20 is secured to the body member 12 by means of U-bolts 51, the ends of which pass through the clamp element 50 at the top of the spring body member 12. In the unassembled condition of the spring body member 12, the channel elements 44 are slightly spaced apart and the rubber pads 46 are in their relaxed state as seen in FIG. 4. However, in the assembled condition, the mounting assembly 18 appears as seen in FIG. 3. In that condition the U-bolts 52 are tightened to bring the channel elements 44 into engagement with each other. By bringing the channel elements 44 into contact with each other, the elements 44 act to limit the amount of load which may be imposed on the rubber pads 46. In an actual embodiment of the invention, it was found desirable to subject the rubber pads 46 to a load which would reduce its unloaded thickness by approximately one-half. Under such conditions, it was found that the loading was to the order of 2500 psi. By bonding the rubber pads 46 to the body member 12 and to the channel elements 44, as well as subjecting the rubber pads 46 to the compressive force, it is possible to sustain forces tending to displace the mounting assemblies relavite to the body member 12. The rubber pads 46 perform an important function in preventing localized stress concentrations between the mounting assemblies 18 and the body member 12.

In actual practice, it has been found that the rubber pads 46 can be bonded to the body members 12 and channel elements 44 by the use of a suitable adhesive, such as an epoxy, or by actually vulcanizing the pads 46 to both the body members 12 and the channel elements 44.

The mounting bosses 48 formed integrally with the channel members 44 make it possible to locate the mounting assembly 18 and particularly the clamp elements 50 and axle seat 51 in a substantially fixed relationship relative to the body member 12 without the necessity of drilling holes, which is common with steel leaf springs. However, by avoiding forming of holes in the body member 12 in the present non-metallic spring, undesirable stress concentrations are avoided.

Other aspects of the invention include the method and apparatus by which the spring body 12 is made. Referring first to FIG. 7, a continuous strand 60 of fiberglass is pulled from a roll 62 and through a vat 64 containing liquid resin 66 and to a winding frame 68. The winding frame 68 is generally rectangular as can be seen in FIG. 9. The frame 68 has side members 70 joined together by a transverse end element 72. The sides 70 telescope into two tubular sides 74 joined together by a transverse end element 72. The two tubular parts 74 contain a pair of springs 78 which act on the ends of the smaller tubular sides 70 tending to bias the end elements 72 and 76 away from each other. Clamp elements in the form of set screws 80 are mounted on each of the tubular sides 74 to engage sides 70. Prior to initiating the winding operation, the end elements 72 and 76 are moved toward each other against the bias of the springs, 78 and the clamp elements 80 are tightened to hold the end elements in temporarily fixed relationship relative to each other.

The frame 68 also is provided with an axle element 82 axialy aligned with the opposite sides of the frame 68 and removably seated in a support structure 84 seen in FIG. 7.

During the winding operation, the frame 68 is rotated end for end relative to its support frame 84 to that strands 60 impregnated with the liquid resin 66 are wound around the opposite ends 72 and 76. During such winding, the frame 68 can be rotated in any well-known manner either manually or by power means, not shown. Frame 68 is rotated a predetermined number of revolutions to obtain the desired ratio of fiber strands to resin in the finished product. A large number of wraps are required and in one form of spring, over two hundred wraps, each made up of two lengths of fiber strands, were employed in a spring having a cross-setional area of less than three square inches. The winding of the strands is conducted to distribute the fiber uniformly over a width on the frame 68 corresponding to the maximum width of the spring body 12. After the winding has been completed, the clamp elements or screws 80 are released so that the spring 78 imposes a tension on the strands tending to maintain them under some tension and in parallel relationship to each other.

After the winding has been completed, the frame 68 is removed from its supporting frame 84 and is placed in position relative to a molding press 90. The press 90 includes an upper mold 92 and a lower mold 94 which meet with each other to form a cavity 96 having a configuration of the finished spring body 12. The upper and lower molds 92 and 94 have an outer dimension to fit within the frame 68. The holding operation is conducted by placing the frame 68 around the lower mold 94 with the filaments wound thereon disposed in the lower cavity 96. The ends of the lower mold 94 at the opposite ends of the cavity 96 are provided with dams or chokes 98 and extend transversely of the cavity 96. With the frame 68 in position around the lower mold 94, the strands pass out of the ends of the cavity 96. When the upper mold 92 is brought down into position, the fiber strands, as well as the liquid resin 66, are pressed in the cavity 96. The strands pass through opposite ends of the closed mold and over the dams 98 which act to contain and prevent the escape of resin from the cavity 96. The mold parts 92 and 94 are heated to a temperature of approximately three hundred degrees (300° F.) during which time the resin cures. After the resin has cured sufficiently for handling, the spring body 12 is removed from the press 90 and the ends are cut to the desired shape to remove excess resin and fiber material formed at the end of the spring body 12.

As the upper and lower molds parts 92 and 94 are moved toward each other, the ends of the strands are displaced downwardly which tend to shorten the frame 68 and submit the strands 60 to additional tension. Because of the configuration of the spring body 12 and the cavity 96, it will be noted that the strands cannot remain truly parallel to each other; but the application of tension to the filament extends to distribute them uniformly throughout all of the transverse cross-sections which, as noted previously, are equal in area.

Referring to FIG. 11, a modified form of the invention is shown in the form of a spring assembly 110 including a body member 112 which, like the body member 12 in the first embodiment, is made up of glass fibers in a matrix of polymerized resin. In this particular embodiment, however, the body member 112 is of a uniform width with the thickness varying from a maximum in an area intermediate the opposite ends to a minimum of thickness at the ends. The body member 112 is illustrated as being provided with end fittings 36 of the type shown in Figure 6. The intermediate portion of the body member 112 is provided with a mounting assembly 18 identical with that used with the body member 12.

In this embodiment of the invention, the body member 112 has the greatest cross-sectional area at a midpoint with the cross-sectional areas of the body member 112 diminishing in area as the opposite ends are approached. However, in each of the cross-sections which vary in area, the distribution of the fibers or strands is in substantially the same proportion to resin as in the prior embodiment having equal cross-sections. In other words, a distribution of at least fifty percent and up to sixty-three percent of fiber strands is disposed in each cross-section. However, in this instance the central portion of the body member 112 contains a larger number of strands than the smaller end sections.

The body member 112 is fabricated of layers of fiber tape 114 having uniform width substantially equal to the width of the body member 112. The tape 114 is made up of strands of fiber 116 extending longitudinally of the tapes and transverse strands 118. The layers of tape 114 are cut to length and arranged in layers. As best seen in FIG. 15 top and bottom of layers of fiber tape are the longest and are of a length at least equal to the length of the body member 112 with each successive layer of tape 114 being shorter as layers progress inwardly of the spring.

Body member 112 of the spring assembly 110 is manufactured in a mold similar to that shown in FIGS. 8 and 9 except that an upper mold 122 and lower mold 124 form a cavity 126 having the configuration of the body member 112. With the mold halves 122 and 124 in their open position as shown in FIG. 16, layers of fiber tape 114 are saturated in liquid resin and are laid in the mold cavity 126 with the long layer on the bottom and with succeeding layers being progressively shorter. At the mid-point of the spring a mass of chopped fibers indicated at 128 in Figure 13 and wetted in liquid resin can be added to the mold cavity, if desired. Subsequently, a short layer of tape 114 can be disposed in the mold cavity with each of the adjacent layers becoming progressively longer until the upper layer is reached which will have a length at least equal to the desired length of the spring.

After the mold cavity, the mold portions 122 and 124 are brought into mating relationship to each other so that resin is forces against the dams 98 at the ends of the mold and the resin is allowed to cure. After the resin has cured at least sufficiently for handling, the body member 112 is removed from the press and the ends are trimmed to establish the desired length of body member 112.

A non-metallic leaf spring has been provided wherein a unitary body member is made up of strands of fiber such as glass distributed in a matrix of polymerized resin such as epoxy. End fittings and the central mounting assembly are provided by which stress concentrations are avoided between the metallic members and the non-metallic body member of the leaf spring assembly. The apparatus and method by which the spring is made insures that strands of fibers are arranged longitudinally of the body member and at a substantially uniform density with the mold in which the springs are formed being provided with resin dams insuring that the mold cavity is completely occupied by fiber strands and resin.

The embodiments of the invention in which an exclusive property or privilege is claimed are defined as follows:

1. The method of making a leaf spring of varying width comprising the step of:
    (a) providing sources of a continuous glass fiber strand, a vat containing liquid resin and a rectangular winding frame having side members joined by transverse end members;
    (b) providing biasing between said end members normally causing said end members to move away from each other;

(c) moving said end members towards each other to overcome said biasing;
(d) clamping said end members in fixed positions;
(e) pulling said glass fiber strands through said vat to coat said strand with resin as it is wound on said winding frame to provide elongated glass fiber strands thereon;
(f) releasing said clamping after said winding operation;
(g) providing a mold having two pieces disposed to be closed under pressure and forming an elongated cavity therebetween conforming to the shape of said leaf spring;
(h) placing said strands on said frame in said elongated cavity formed in said mold with said glass fiber strands being distributed uniformly throughout transverse cross-sections extending longitudinally of said mold cavity with said glass fiber strands being arranged in a parallel relationship to each other and supported in a pattern no greater than the maximum width of said spring prior to placing said glass fiber strands in said cavity of said mold;
(i) maintaining said mold at a temperature of about 300 degrees fahrenheit while said resin is curing;
(j) pressing the length of glass fiber strands between said two pieces of said mold until said resin is cured;
(k) maintaining said glass fiber stands under tension during said pressing by said biasing; and
(l) providing dams in one of said two pieces on opposite ends and transverse to said elongated cavity to prevent resin from escaping from said cavity when said two pieces are closed to assure that said cavity is completely filled with resin.

* * * * *